United States Patent
Iguchi et al.

(10) Patent No.: US 8,191,232 B2
(45) Date of Patent: Jun. 5, 2012

(54) METHOD OF MANUFACTURING SPINDLE MOTOR

(75) Inventors: Takuro Iguchi, Kyoto (JP); Tsuyoshi Morita, Kyoto (JP); Toshihiro Akiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 818 days.

(21) Appl. No.: 12/277,328

(22) Filed: Nov. 25, 2008

(65) Prior Publication Data

US 2009/0133244 A1    May 28, 2009

(30) Foreign Application Priority Data

Nov. 26, 2007    (JP) ................................. 2007-304644

(51) Int. Cl.
*H02K 5/16*    (2006.01)
*H02K 15/00*    (2006.01)

(52) U.S. Cl. ................... 29/603.03; 82/1.11; 360/98.08; 360/99.12

(58) Field of Classification Search ............... 29/603.03, 29/596; 82/1.11; 360/98.08, 99.12; 310/42
See application file for complete search history.

(56) References Cited

U.S. PATENT DOCUMENTS

| | | | |
|---|---|---|---|
| 5,457,588 A | 10/1995 | Hattori et al. | |
| 5,533,811 A | 7/1996 | Polch et al. | |
| 5,761,002 A * | 6/1998 | Moir et al. | 360/98.08 |
| 5,964,027 A * | 10/1999 | Tochiyama | 29/596 |
| 6,578,454 B2 * | 6/2003 | Addy | 82/1.11 |
| 7,281,852 B2 | 10/2007 | Woldemar et al. | |
| 2003/0030222 A1 | 2/2003 | Grantz et al. | |
| 2004/0165797 A1 | 8/2004 | Oku et al. | |
| 2004/0240104 A1 | 12/2004 | Francuski et al. | |
| 2006/0051001 A1 | 3/2006 | Nishimura et al. | |
| 2006/0255673 A1 | 11/2006 | Sekii | |
| 2007/0133911 A1 | 6/2007 | Nishimoto et al. | |
| 2008/0056104 A1 | 3/2008 | Nishimura et al. | |
| 2009/0133244 A1 | 5/2009 | Iguchi et al. | |

FOREIGN PATENT DOCUMENTS

| | | |
|---|---|---|
| JP | 2000-245104 | 9/2000 |
| JP | 2000-354349 | 12/2000 |
| JP | 2002-005171 | 1/2002 |
| JP | 2004286145 | 10/2004 |
| JP | 2004350494 | 12/2004 |
| JP | 2005-048890 | 2/2005 |
| JP | 2005291452 | 10/2005 |
| JP | 2006158015 | 6/2006 |
| JP | 2007162759 | 6/2007 |
| JP | 2007327528 | 12/2007 |

OTHER PUBLICATIONS

Sekii et al.; "Fluid Dynamic Pressure Bearing Device, Spindle Motor and Disk Drive Apparatus"; U.S. Appl. No. 12/400,884, filed Mar. 10, 2009.

(Continued)

*Primary Examiner* — Livius R Cazan
(74) *Attorney, Agent, or Firm* — Keating & Bennett, LLP

(57) ABSTRACT

A sleeve and a hub are fixed to each other, and then the sleeve and the hub are gripped and rotated around a central axis, during which cutting is performed over the inner peripheral surface of the sleeve and a flange surface of the hub. Thus, the flange surface can be finished accurately such that the flange surface is normal to the central axis and the inner peripheral surface of the sleeve.

13 Claims, 13 Drawing Sheets

OTHER PUBLICATIONS

Sekii et al.; "Fluid Dynamic Pressure Bearing Device, Spindle Motor and Disk Drive Apparatus"; U.S. Appl. No. 12/765,122, filed Apr. 22, 2010.

Sekii et al., "Fluid Dynamic Pressure Bearing Device, Spindle Motor and Disk Drive Apparatus", U.S. Appl. No. 13/197,820, filed Aug. 4, 2011.

* cited by examiner

METHOD OF MANUFACTURING SPINDLE MOTOR

BACKGROUND OF THE INVENTION

1. Field of the Invention

The present invention relates to methods of manufacturing spindle motors, and the spindle motors manufactured through the methods.

2. Description of the Related Art

Spindle motors are mounted in hard disk drives for use in, e.g., personal computers and car navigation systems to rotate magnetic disks around central axes thereof. A spindle motor includes a stator unit that is fixed to the housing of a hard disk drive and a rotor unit that is rotated relative to the stator unit with a magnetic disk loaded thereon.

Among various types of spindle motors, a spindle motor of a stationary shaft type is provided with a shaft as part of the stator unit, and the rotor unit is rotated around the shaft. In such a spindle motor of a stationary shaft type, the rotor unit includes a sleeve that is inserted in a rotatable manner relative to the shaft and a hub that is rotated together with the sleeve. The hub is provided with a flange surface to mount a disk thereon.

For example, Japanese Unexamined Patent Publication Nos. 2000-354349, 2002-5171, and 2005-48890 disclose the structure of such a conventional spindle motor.

In the above-mentioned spindle motor, the inner peripheral surface of the sleeve and the flange surface of the hub are closely relevant to the attitude of the magnetic disk and the rotational accuracy. That is, the magnetic disk should be rotated stably in an attitude normal to the central axis of the shaft. For this reason, the inner peripheral surface of the sleeve and the flange surface of the hub are desirably finished with a high degree of accuracy such that the inner peripheral surface of the sleeve, which opposes the outer peripheral surface of the shaft, is parallel to the central axis, and that the flange surface to support the magnetic disk is normal to the central axis.

If the inner peripheral surface of the sleeve and the flange surface of the hub are imperfectly finished, the magnetic head floats unstably over the recording surface of the magnetic disk, which may be a setback for high-density recording.

In addition, a slight distortion inevitably occurs both in the sleeve and the hub in fixing them. Such a distortion in the sleeve and the hub may adversely affect the attitude of the disk and the rotational accuracy.

SUMMARY OF THE INVENTION

A spindle motor according to an aspect of the present invention includes a shaft, an annular portion, a substantially cylindrical sleeve, and a hub. The shaft is disposed along a central axis. The annular portion stretches radially outward from the outer peripheral surface of the shaft. The sleeve receives the shaft and has an inner peripheral surface radially opposite the outer peripheral surface of the shaft and a bearing surface opposite the annular portion. The hub rotates together with the sleeve while supporting a disk. The spindle motor is manufactured through the following manufacturing method including the steps of:

a) fixing the sleeve and the hub to each other; and
b) after the step a), performing cutting on the inner peripheral surface of the sleeve, the bearing surface of the sleeve, and a flange surface of the hub for mounting the disk, while the sleeve and the hub are being gripped and rotated around the central axis.

According to an aspect of the present invention, the sleeve and the hub are fixed to each other, and cutting is then performed on the inner peripheral surface of the sleeve and the flange surface of the hub while the sleeve and the hub are being gripped and rotated around the central axis; therefore, the flange surface can be finished accurately such that the flange surface is substantially normal to the central axis and the inner peripheral surface of the sleeve. In addition, even if the sleeve and the hub are slightly distorted in fixing them, the inner peripheral surface of the sleeve and the flange surface of the hub can be finished accurately with respect to the central axis irrespective of the distortion.

Moreover, the inner peripheral surface of the sleeve and the bearing surface of the sleeve, as well as the flange surface of the hub, can be finished accurately with respect to the central axis.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
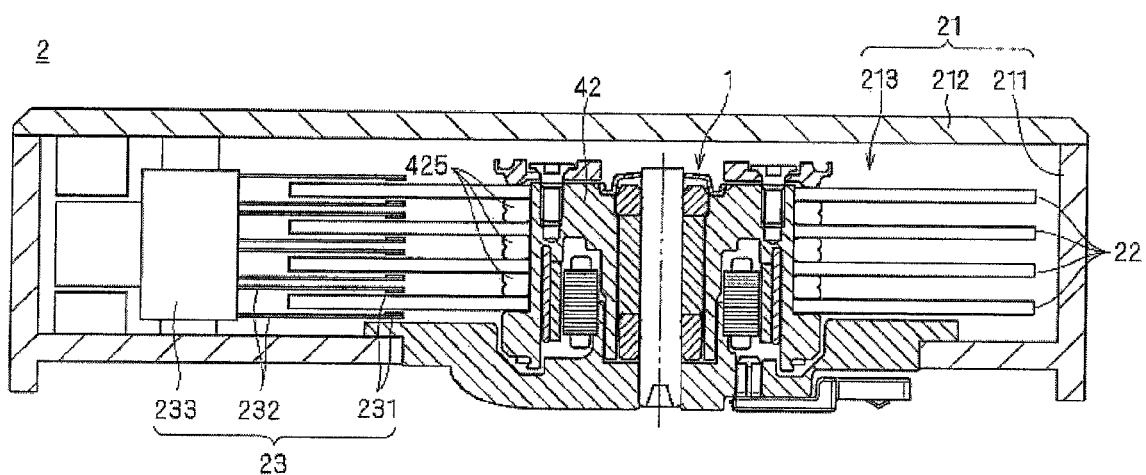
FIG. 1 is a cross-sectional view of a disk drive taken along a plane including a central axis.

Referring to FIGS. 1 through 13, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

A preferred embodiment of the present invention will be described below with reference to the drawings. In the following description, the side of a rotor unit 4 is referred to as an upper side, and the side of a stator unit 3 is referred to as a lower side, along a central axis L for convenience's sake; however, the attitude in which a spindle motor according to the present invention is installed is not limited thereto.

FIG. 1 is a cross-sectional view of a disk drive 2 including a spindle motor 1 according to one embodiment of the present invention, taken along a plane including the central axis.

The disk drive 2 is a hard disk drive that performs reading and writing of information from and into magnetic disks 22 while rotating the four magnetic disks 22. As shown in FIG. 1, the disk drive 2 includes a housing 21, the four magnetic disks (hereinafter simply referred to as "disks") 22, an access unit 23, and the spindle motor 1.

The housing 21 includes a cup-shaped first housing member 211 and a plate-like second housing member 212. The first housing member 211 has an opening at its upper portion and is mounted with the spindle motor 1 and the access unit 23 on its inner bottom surface.

The second housing member 212 is joined to the first housing member 211 so as to close the opening at the upper portion of the first housing member 211. The four disks 22, the access unit 23, and the spindle motor 1 are housed in an internal space 213 of the housing 21 enclosed with the first housing member 211 and the second housing member 212. The internal space 213 of the housing 21 is an almost dustless clean space.

The four disks 22 are circular disc-shaped information recording media, each having a hole at the center. The disks 22 are mounted to a hub 42 of the spindle motor 1 to be arranged substantially parallel to one another at equal intervals with spacers 425 each interposed therebetween.

Meanwhile, the access unit 23 includes eight heads 231, arms 232, and oscillating mechanisms 233. The heads 231 oppose the upper and lower surfaces of each of the four disks. The arms 232 support the heads 231 respectively. The oscillating mechanisms 233 oscillate the arms 232 respectively. The access unit 23 oscillates the eight arms 232 across the disks 22 by means of the oscillating mechanisms 233 to cause the eight heads 231 to access required positions over the disks 22, whereby information is read and written from and into the recording surfaces of the rotating disks 22. The heads 231 may only either read or write information with respect to the recording surfaces of the disks 22.

Figure 2:
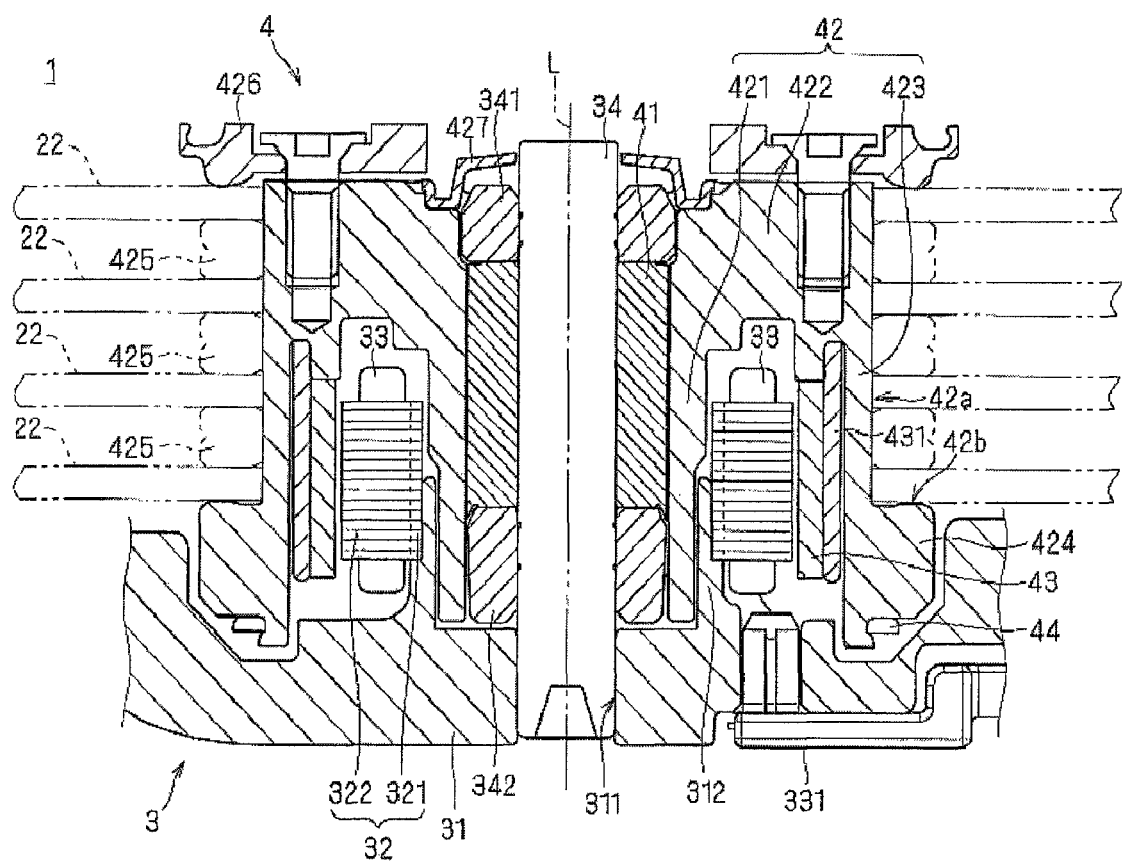
FIG. 2 is a cross-sectional view of a spindle motor of FIG. 1 taken along a plane including the central axis.

Next, the structure of the above spindle motor 1 is detailed. FIG. 2 is a cross-sectional view of the spindle motor 1 taken along a plane including the central axis. As shown in FIG. 2, the spindle motor 1 includes the stator unit 3 and the rotor unit 4. The stator unit 3 is fixed to the housing 21 of the disk drive 2, and the rotor unit 4 rotates around the predetermined central axis L with the disks 22 loaded thereon.

The stator unit 3 includes a base member 31, a stator core 32, coils 33, and a shaft 34.

The base member 31 is formed from a metal material such as aluminum and is screwed to the housing 21 of the disk drive 2. A through hole 311 is provided along the central axis through the base member 31 at the center of the base member 31. A substantially cylindrical holder part 312 is also provided at the outer peripheral side (the outer peripheral side relative to the central axis L; the same holds true in the following description) of the through hole 311 of the base member 31 so as to project in an axial direction (a direction along the central axis L; the same holds true in the following description). It should be noted that, although the base member 31 and the first housing member 211 are provided as separate members in the present embodiment, the present invention is not limited thereto, and the base member 31 and the first housing member 211 may be provided as a single member.

The stator core 32 includes an annular core back 321 and a plurality of teeth 322. The core back 321 is fitted over the outer peripheral surface of the holder part 312 of the base member 31. The teeth 322 project to the outer peripheral side in a radial direction (a direction orthogonal to the central axis L; the same holds true in the following description) from the core back 321. The stator core 32 is formed of, e.g., a plurality of magnetic steel-sheets laminated in the axial direction.

The coils 33 are formed of conductive wires wound around the teeth 322 of the stator core 32. The coils 33 are connected to a predetermined power source device (not shown) through a connector 331. When a drive current is applied through the coils 33 by way of the connector 331, radial magnetic flux is produced over the teeth 322. The magnetic flux produced over the teeth 322 interacts with magnetic flux over a rotor magnet 43 to be described later, to develop torque to cause the rotor unit 4 to rotate around the central axis L.

The shaft 34 is a substantially columnar member disposed along the central axis L. The shaft 34 is fixed to the base member 31 with its lower end portion fitted within the through hole 311 of the base member 31.

A substantially annular upper thrust washer 341 and a substantially annular lower thrust washer 342 are fixed to the outer peripheral surface of the shaft 34. The upper thrust washer 341 is disposed above a sleeve 41, whereas the lower thrust washer 342 is disposed below the sleeve 41. The upper and lower thrust washers 341 and 342 are bonded to the shaft 34 with an adhesive. The annular portion refers to each of the upper and lower thrust washers 341 and 342 in the present embodiment.

The upper and lower thrust washers 341 and 342 are formed from a metal material or a resin material that is close to the hub 42 in coefficient of linear expansion. The exemplary metal materials include an alloy primarily containing aluminum and an alloy primarily containing copper.

Figure 3:
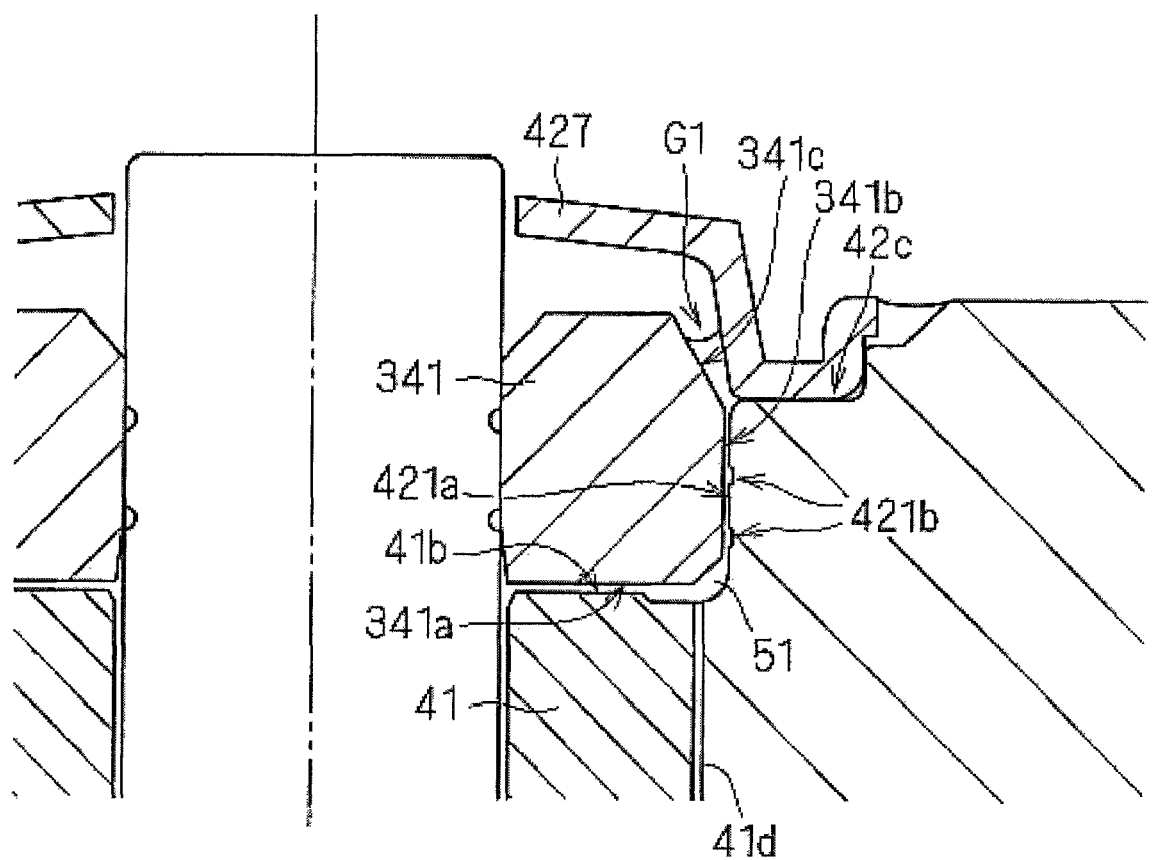
FIG. 3 is a cross-sectional view of an upper thrust washer and the structure in the vicinity thereof taken along a plane including the central axis.

FIG. 3 is a cross-sectional view of the upper thrust washer 341 and the structure in the vicinity thereof, taken along a plane including the central axis. As shown in FIG. 3, the upper thrust washer 341 has a lower surface 341a, an outer peripheral surface 341b, and a tapered surface 341c. The lower surface 341a opposes the upper surface 41b of the sleeve 41. The outer peripheral surface 341b opposes a pump seal surface 421a of the hub 42. The tapered surface 341c converges upward from the upper end of the outer peripheral surface 341b.

Figure 4:
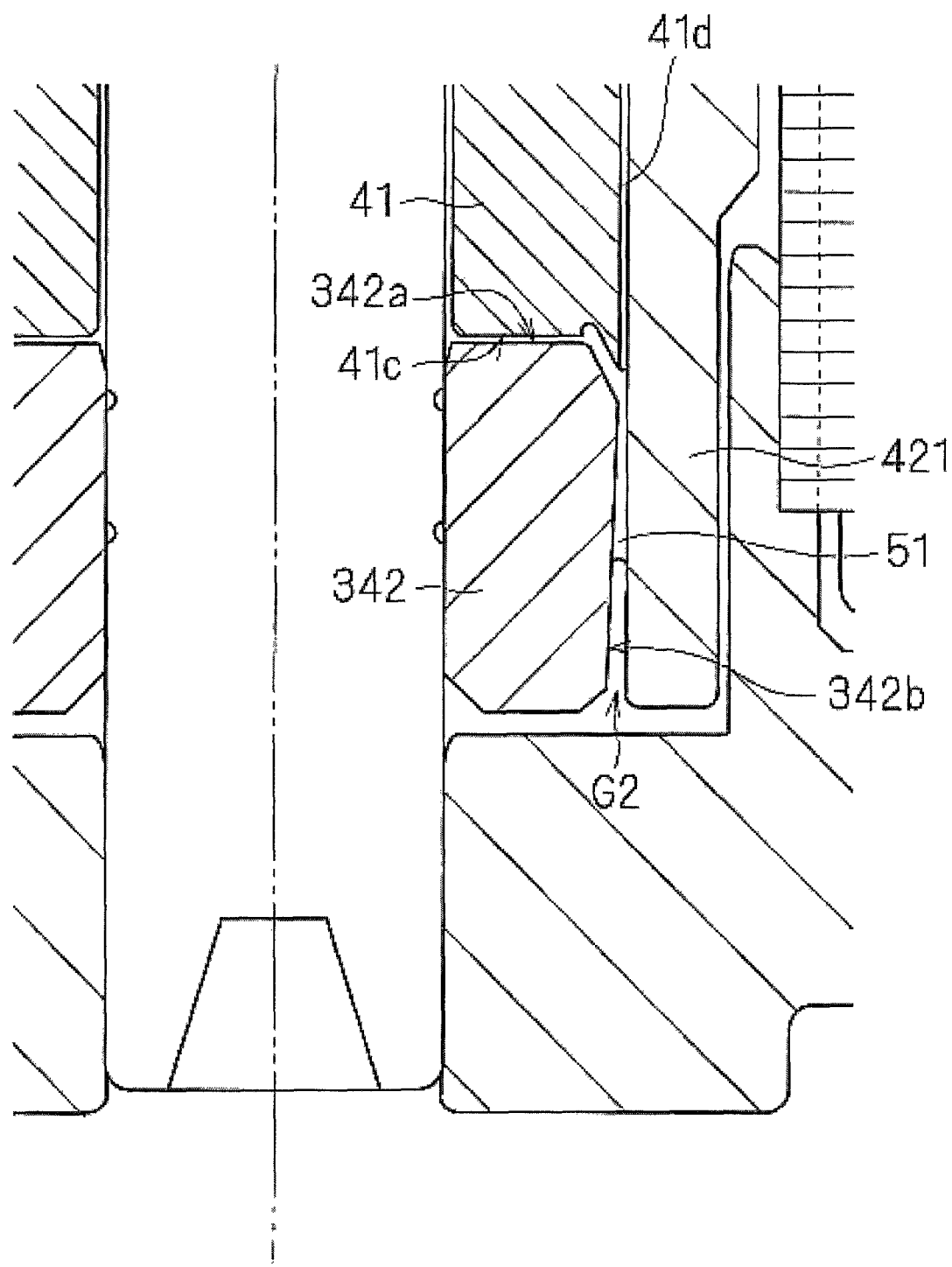
FIG. 4 is a cross-sectional view of a lower thrust washer and the structure in the vicinity thereof taken along a plane including the central axis.

FIG. 4 is a cross-sectional view of the lower thrust washer 342 and the structure in the vicinity thereof, taken along a plane including the central axis. As shown in FIG. 4, the lower thrust washer 342 has an upper surface 342a and a tapered outer peripheral surface 342b. The upper surface 342a opposes the lower surface 41c of the sleeve 41. The outer peripheral surface 342b is reduced in outer diameter toward the lower side.

In the present embodiment, the upper and lower thrust washers 341 and 342 are provided as separate members from the shaft 34, but the present invention is not limited thereto. For instance, the shaft 34 and either of the upper thrust washer 341 or the lower thrust washer 342 may be provided as a single member.

Referring back to FIG. 2, the rotor unit 4 includes the sleeve 41, the hub 42, and the rotor magnet 43.

The sleeve 41 is a substantially cylindrical member disposed at the outer peripheral side of the shaft 34 to encircle the shaft 34 with its inner peripheral surface. The sleeve 41 is disposed between the upper and lower thrust washers 341 and 342 and is supported rotatably relative to the shaft 34.

Lubricant oil 51 (see FIGS. 3 and 4) is filled uninterruptedly in a minute gap (on the order of several μm) between the sleeve 41 and the shaft 34, a minute gap between the sleeve 41 and the upper thrust washer 341, a minute gap between the sleeve 41 and the lower thrust washer 342, and an oil groove 41d (see FIGS. 3 and 4) provided axially on the outer peripheral surface of the sleeve 41.

For example, an oil primarily containing ester, such as a polyol ester oil or a diester oil, is used for the lubricant oil 51.

Figure 5:
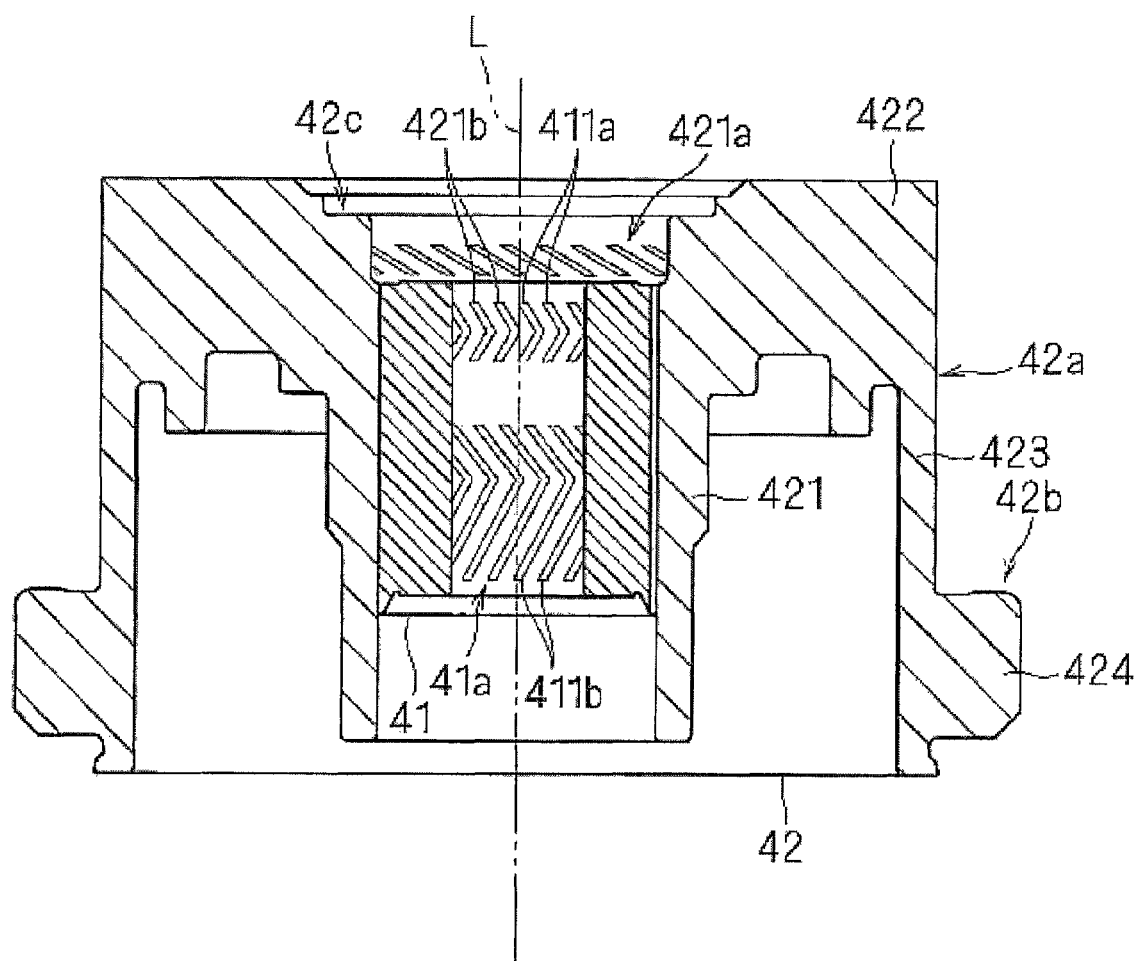
FIG. 5 is a cross-sectional view showing only a sleeve and a hub taken along a plane including the central axis.

FIG. 5 is a cross-sectional view showing only the sleeve 41 and the hub 42, taken along a plane including the central axis. As shown in FIG. 5, the inner peripheral surface 41a of the sleeve 41 is provided with arrays 411a and 411b of herringbone radial dynamic pressure grooves. The radial dynamic pressure groove arrays 411a and 411b induce hydrodynamic pressure in the lubricant oil 51 filled between the outer peripheral surface of the shaft 34 and the inner peripheral surface 41a of the sleeve 41. Upon rotation of the sleeve 41 and the hub 42 relative to the shaft 34, the lubricant oil 51 is pressurized by means of the radial dynamic pressure groove arrays 411a and 411b, and the hydrodynamic pressure produced in the lubricant oil 51 causes the sleeve 41 to rotate while being supported radially.

Figure 6:
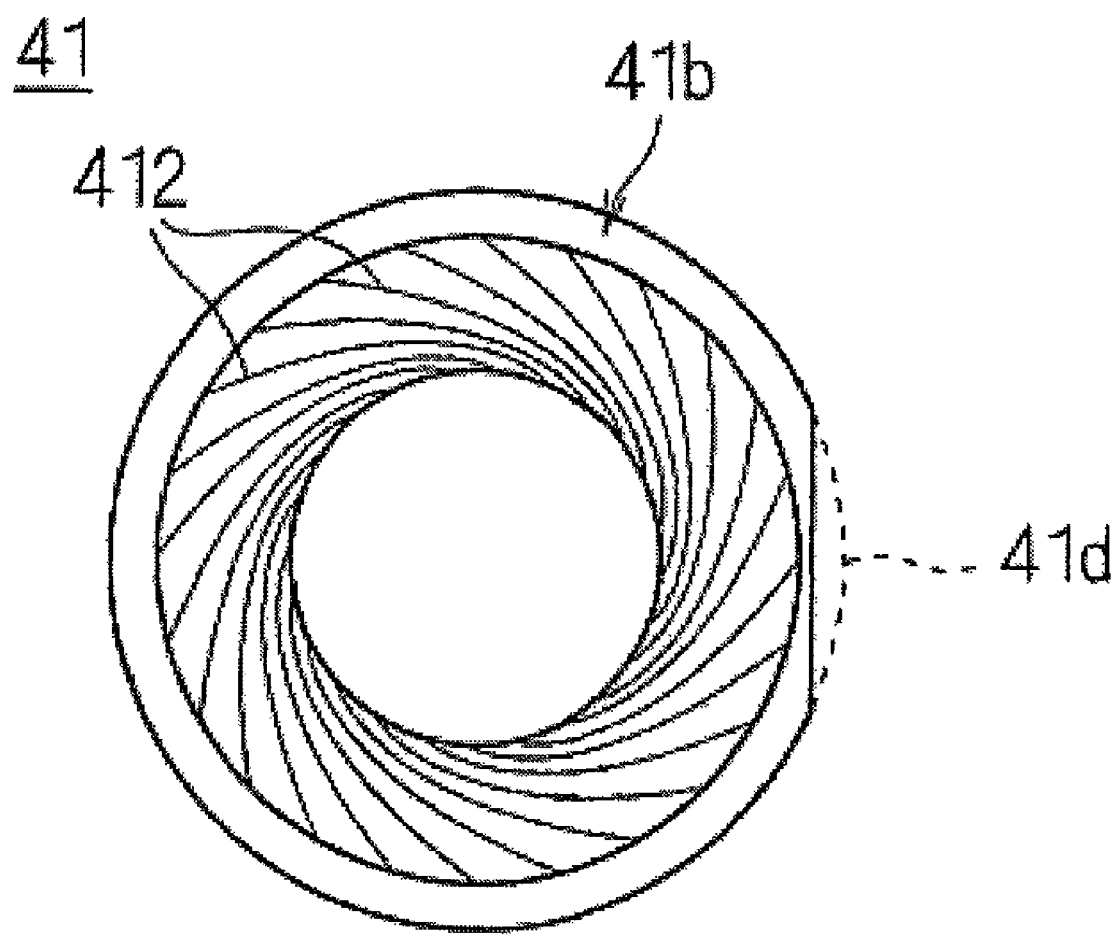
FIG. 6 is a top view of the sleeve.
Figure 7:
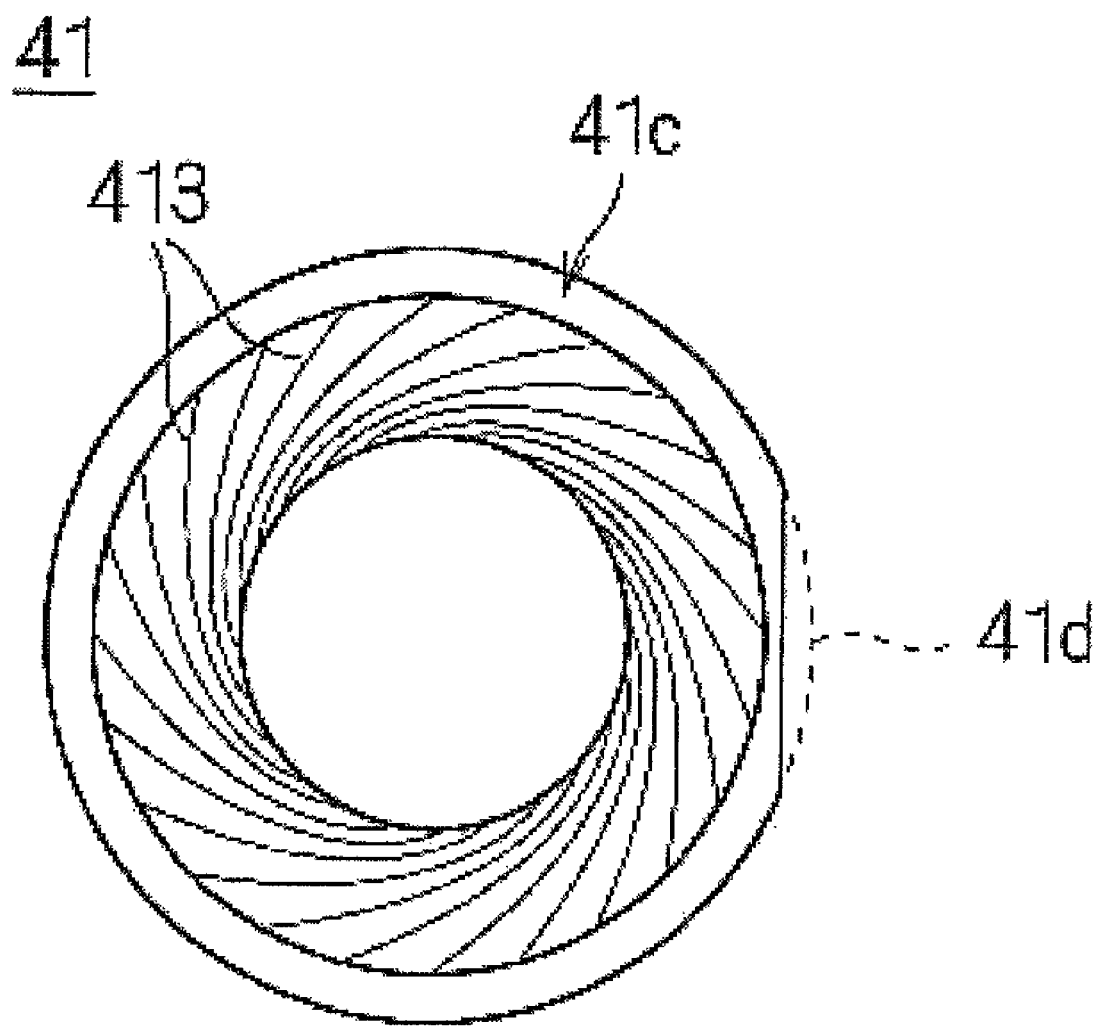
FIG. 7 is a bottom view of the sleeve.

FIGS. 6 and 7 show a top view and a bottom view of the sleeve 41, respectively. As shown in FIG. 6, an upper array 412 of thrust dynamic pressure grooves is provided on the upper surface 41b of the sleeve 41. The upper thrust dynamic pressure groove array 412 develops hydrodynamic pressure in the lubricant oil 51 filled between the lower surface 341a of the upper thrust washer 341 and the upper surface 41b of the sleeve 41.

Also, as shown in FIG. 7, a lower array 413 of thrust dynamic pressure grooves is provided on the lower surface 41c of the sleeve 41. The lower thrust dynamic pressure groove array 413 develops hydrodynamic pressure in the lubricant oil 51 filled between the upper surface 342a of the lower thrust washer 342 and the lower surface 41c of the sleeve 41.

Upon rotation of the sleeve 41 and the hub 42 relative to the shaft 34, the lubricant oil 51 is pressurized by means of the upper and lower thrust dynamic pressure groove arrays 412 and 413, and the hydrodynamic pressure produced in the lubricant oil 51 causes the sleeve 41 to rotate while being supported axially.

It should be noted that the bearing surface of the sleeve refers to each of the upper and lower surfaces 41b and 41c of the sleeve 41 in the present embodiment.

Returning to FIG. 2, the hub 42 is a member that is fixed to the sleeve 41 and rotates with the sleeve 41. The hub 42 is so shaped as to stretch radially around the central axis L. More specifically, the hub 42 includes a first cylindrical portion 421, a flat portion 422, and a second cylindrical portion 423. The first cylindrical portion 421 is fixed to the outer peripheral surface of the sleeve 41 by means of, e.g., shrink fitting. The flat portion 422 stretches radially outward from the upper end of the first cylindrical portion 421. The second cylindrical portion 423 hangs from the outer peripheral edge of the flat portion 422.

An outer peripheral surface 42a of the second cylindrical portion 423 contacts the inner peripheries (the inner peripheral surfaces or the inner peripheral edges) of the disks 22. In the vicinity of the lower end of the second cylindrical portion 423, a mount part 424 is provided projecting radially outward such that its upper surface serves as a flange surface 42b to mount a disk 22 thereon.

The four disks 22 are disposed horizontally on and above the flange surface 42b of the hub 42 at substantially equal intervals. That is, the flange surface 42b is mounted with the lowermost disk 22, above which the other three disks 22 are placed one after another with the spacers 425 interposed between each of the disks 22. The upper surface of the uppermost disk 22 is pressed with a clamp member 426 attached to the flat portion 422 of the hub 42.

The inner peripheries of the disks 22 meet the outer peripheral surface 42a of the second cylindrical portion 423, whereby the disks 22 are regulated in radial movement. In the present embodiment, the disks 22 and the hub 42 are all made mainly from aluminum; therefore, the disks 22 and the hub 42 are the same or approximate each other in coefficient of linear expansion, and even when the temperatures of the disks and the hub change, no excessive stress will occur among the disks 22 and the hub 42.

Figure 8:
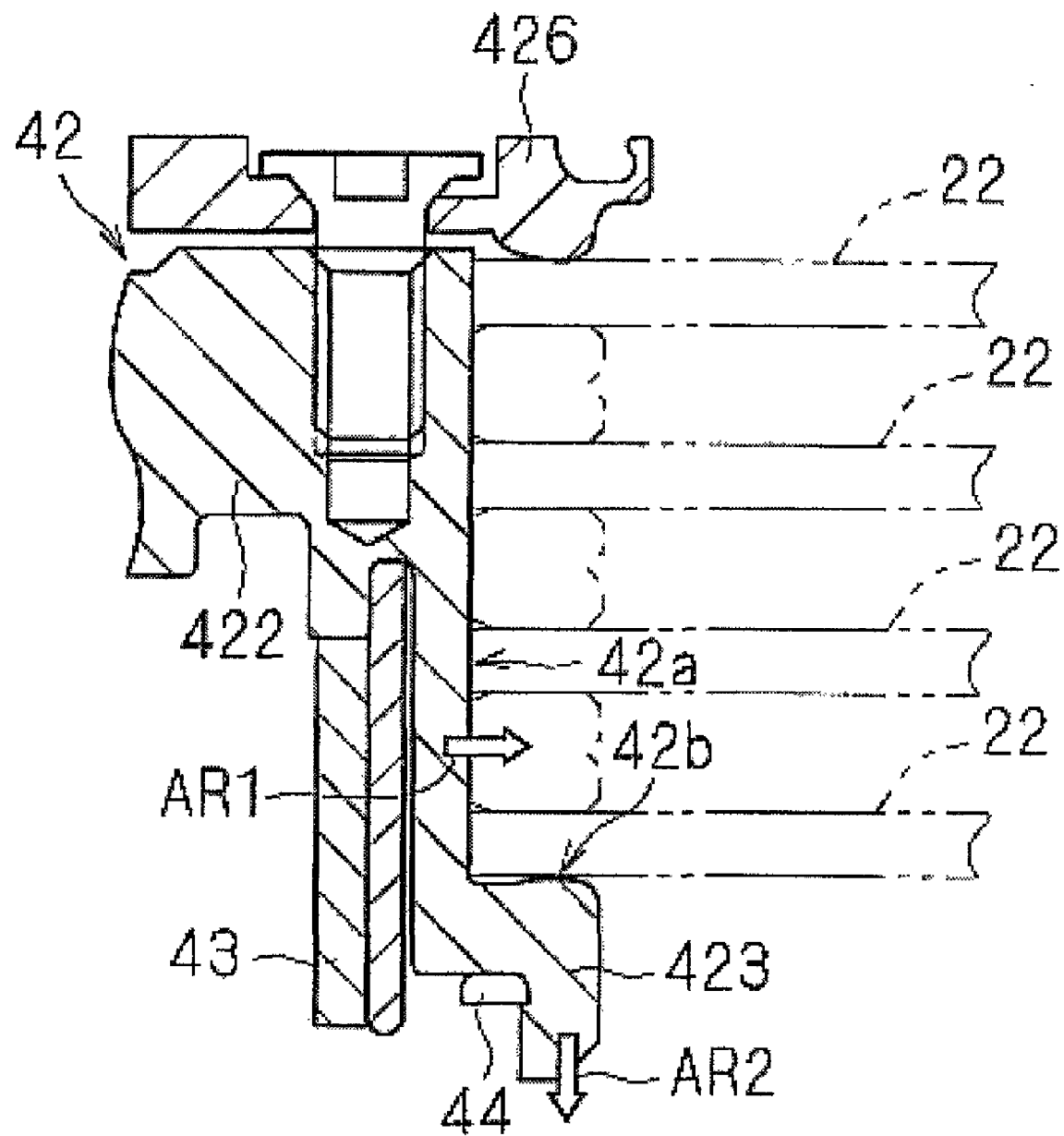
FIG. 8 is a cross-sectional view of a second cylindrical portion and the structure in the vicinity thereof with a balance ring fitted to an inner peripheral surface of the hub, taken along a plane including the central axis.

A balance ring 44 is attached to an outer peripheral surface of the second cylindrical portion 423 under the mount part 424 so as to correct imbalance in mass distribution in the rotor unit 4. As shown in FIG. 8, if the balance ring 44 is to be attached to an inner peripheral surface or a lower surface of the hub 42, the second cylindrical portion 423 of the hub 42 needs to be hooked to the outer peripheral side.

In the structure of FIG. 8, therefore, the hub 42 may be deformed in the directions of arrows AR1 and AR2 in the figure when the disks 22 are loaded. In this regard, the hub 42 of the present embodiment has such a structure that the balance ring 44 is attached to an outer peripheral surface of the second cylindrical portion 423. Accordingly, a large axial thickness can be ensured for the mount part 424, so that it is possible to suppress the deformation of the hub 42 to a small degree in loading the disks 22.

The inner peripheral surface at an upper portion of the first cylindrical portion 421 of the hub 42 opposes the outer peripheral surface 341b of the upper thrust washer 341 across a minute gap and is formed into the pump seal surface 421a.

The pump seal surface 421a acts with the outer peripheral surface 341b of the upper thrust washer 341 to prevent leakage of the lubricant oil 51. As shown in FIGS. 3 and 5, an array 421b of pump grooves is provided on the pump seal surface 421a of the hub 42. The pump groove array 421b develops hydrodynamic pressure to cause the lubricant oil 51 filled between the outerperipheral surface 341b of the upper thrust washer 341 and the pump seal surface 421a of the hub 42 to flow downward. Upon rotation of the hub 42 relative to the upper thrust washer 341, the lubricant oil 51 is pressurized by means of the pump groove array 421b, and the hydrodynamic pressure that is produced in the lubricant oil 51 in the downward direction prevents leakage of the lubricant oil 51.

As described above, the upper and lower thrust washers 341 and 342 are made from a metal material or a resin material that is close to the hub 42 in coefficient of linear expansion; therefore, even when a temperature change occurs, such a situation can be obviated that the gap between the outer peripheral surface 341b of the upper thrust washer 341 and the pump seal surface 421a of the hub 42 expands excessively, or the outer peripheral surface 341b of the upper thrust washer 341 touches the pump seal surface 421a of the hub 42. Accordingly, it is possible to favorably prevent leakage of the lubricant oil 51 between the outer peripheral surface 341b of the upper thrust washer 341 and the pump seal surface 421a of the hub 42.

The upper surface of the first cylindrical portion 421 of the hub 42 is provided substantially normal to the central axis L. The upper surface is a processing reference plane 42c. The processing reference plane 42c is referred to in setting processing positions for forming the radial dynamic pressure groove arrays 411a and 411b, the upper and lower thrust dynamic pressure groove arrays 412 and 413, and the pump groove array 421b, during the manufacturing process of the spindle motor 1.

Referring back to FIG. 2, a cap 427 with a shaft hole at the center is attached to the upper surface of the first cylindrical portion 421 of the hub 42. The cap 427 covers over the upper thrust washer 341 and is bonded to the hub 42 with an adhesive applied along the outer periphery of the cap 427.

As shown in FIG. 3, a gap G1 is provided between the tapered surface 341c of the upper thrust washer 341 and the cap 427 opposite the tapered surface 341c so as to enlarge toward the upper side. With this structure, the lubricant oil 51 is drawn downward due to surface tension, between the tapered surface 341c and the cap 427.

Also, the gap G1 between the tapered surface 341c and the cap 427 expands in a direction slightly skewed inward, so that the centrifugal force caused by the rotation of the rotor unit 4 urges the lubricant oil 51 between the tapered surface 341c and the cap 427 in a radially outward direction. Through these actions, it is possible to prevent the lubricant oil 51 from leaking from between the tapered surface 341c of the upper thrust washer 341 and the cap 427.

As shown in FIG. 4, the lower thrust washer 342 has the tapered outer peripheral surface 342b that reduces in outer diameter toward the lower side. Thus, a gap G2 is provided between the outer peripheral surface 342b of the lower thrust washer 342 and the inner peripheral surface of the first cylindrical portion 421 of the hub 42 so as to enlarge toward the lower side. Thus, the lubricant oil 51 is drawn upward due to surface tension, between the outer peripheral surface 342b of the lower thrust washer 342 and the inner peripheral surface of the first cylindrical portion 421. As such, it is possible to prevent the lubricant oil 51 from leaking from between the outer peripheral surface 342b of the lower thrust washer 342 and the inner peripheral surface of the first cylindrical portion 421.

Referring back to FIG. 2, the rotor magnet 43 is attached to a portion on the lower surface of the flat portion 422 of the hub 42 alongside a yoke 431. The rotor magnet 43 is disposed annularly to encircle the central axis L. The inner peripheral surface of the rotor magnet 43 is a magnetic pole surface that opposes the outer peripheral surfaces of the teeth 322 of the stator core 32.

In such a spindle motor 1, a drive current is passed through the coils 33 of the stator unit 3, whereupon radial magnetic flux is produced over the teeth 322 of the stator core 32. The interaction of magnetic fluxes between the teeth 322 and the rotor magnet 43 develops torque to cause the rotor unit 4 to rotate around the central axis L relative to the stator unit 3. The four disks 22 supported on the hub 42 are rotated around the central axis L together with the sleeve 41 and the hub 42.

Figure 9:
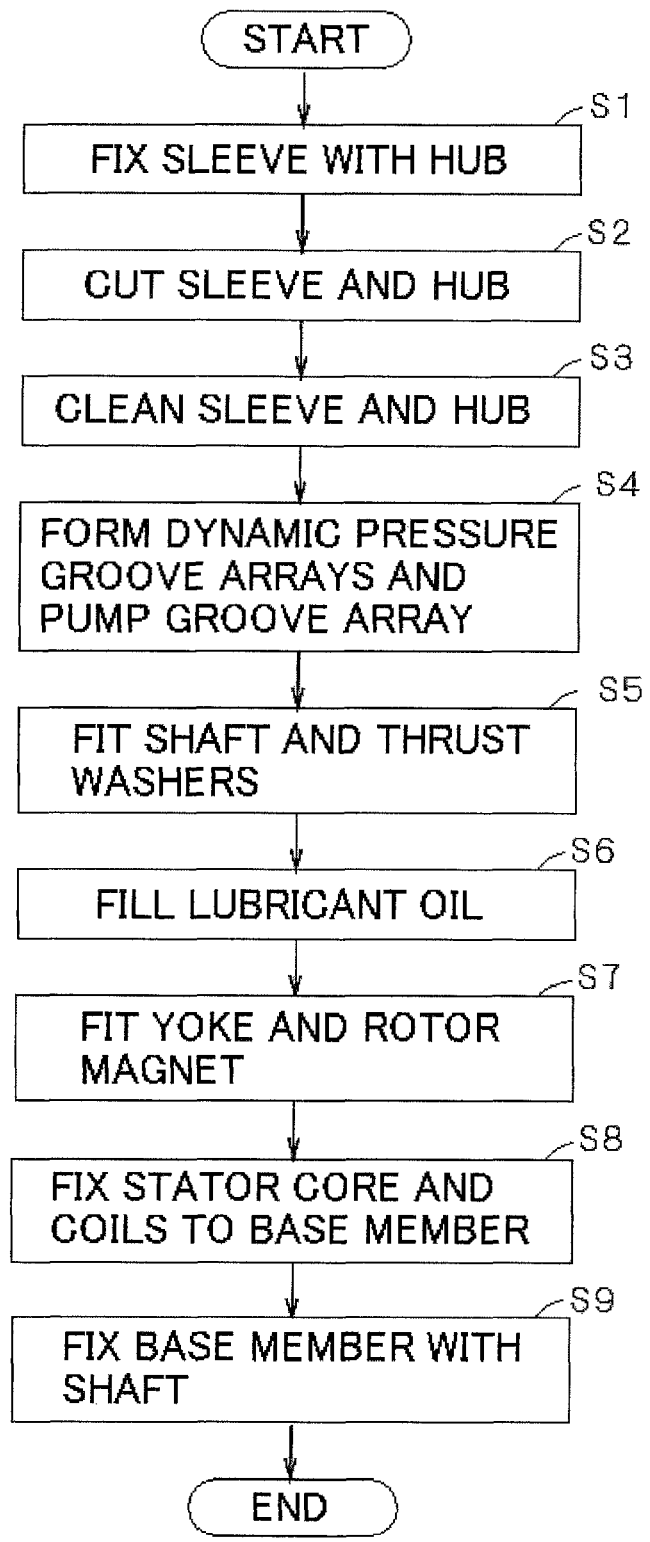
FIG. 9 is a flowchart showing a procedure for manufacturing the spindle motor.
Figure 10:
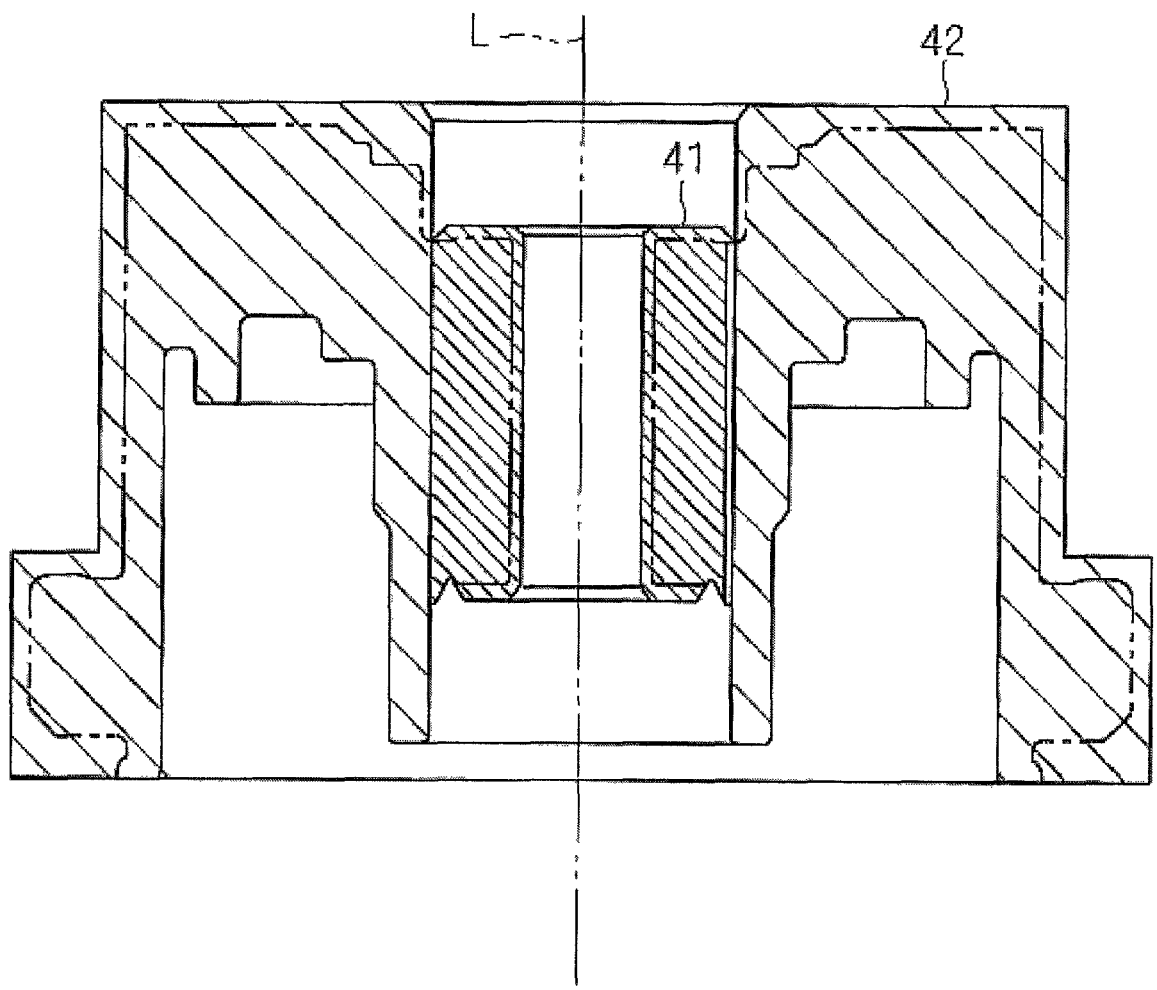
FIG. 10 is a cross-sectional view of the sleeve and the hub before cutting is performed thereon, taken along a plane including the central axis.

Next, a description is given on a procedure for manufacturing the spindle motor 1. FIG. 9 is a flowchart showing a procedure for manufacturing the spindle motor 1. To initiate manufacturing of the spindle motor 1, the uncut sleeve 41 and the uncut hub 42 are fixed to each other first (step S1). Specifically, the hub 42 is heated and expanded, the sleeve 41 and the hub 42 are mated to each other, and then the hub 42 is cooled. That is, so-called shrink fitting is performed to fix the sleeve 41 and the hub 42 to each other. The hub 42 of the present embodiment is made mainly from aluminum that has a large coefficient of linear expansion, which allows shrink fitting to be easily performed thereon. FIG. 10 shows a cross-sectional view of the sleeve 41 and the hub 42 that are fixed to each other through shrink fitting before cutting is performed, taken along a plane including the central axis.

Figure 11:
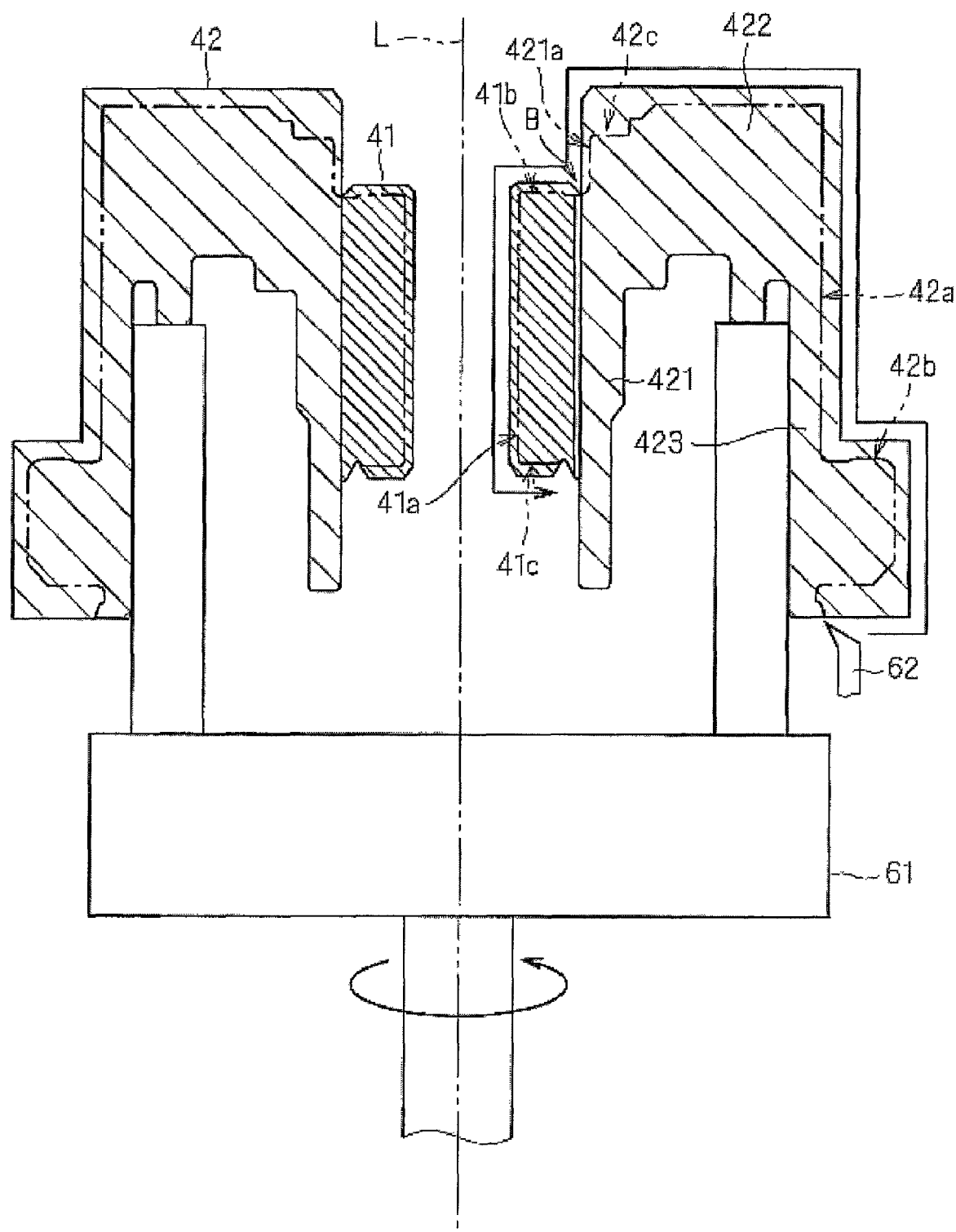
FIG. 11 is a diagram of the sleeve and the hub while the cutting is being performed.

Next, cutting is performed on surfaces of the sleeve 41 and the hub 42 (step S2). Specifically, as shown in FIG. 11, the hub 42 is first gripped by a predetermined chuck mechanism 61, and the chuck mechanism 61 is rotated around the central axis L, so that the sleeve 41 and the hub 42 are rotated. Then, while the sleeve 41 and the hub 42 are being rotated, a cutting tool 62 is moved according to the surface shape to be formed (shown with the dashed line in FIG. 11) on the sleeve 41 and the hub 42, whereby the surfaces of the hub 42 and the sleeve 41 are cut.

The chuck mechanism 61 grips and rotates the hub 42 in a constant holding condition without changing a holding position while the cutting is being performed. The cutting tool 62 continuously performs cutting over the surfaces of the hub 42 and the sleeve 41 starting from the lower end of the second cylindrical portion 423 of the hub 42 to the lower surface 41c of the sleeve 41.

Consequently, the flange surface 42b, the outer peripheral surface 42a of the second cylindrical portion 423, the processing reference plane 42c, and the pump seal surface 421a of the hub 42, as well as the upper surface 41b, the inner peripheral surface 41a, and the lower surface 41c of the sleeve 41, are all cut while being rotated around the fixed central axis L. By doing this, each of the surfaces is finished with highly accurate coaxiality, flatness, positional relationship, and inclination with respect to the central axis L. Specifically, the following improvements in finishing accuracy are achieved with respect to each of the surfaces.

First, a description is made on the relationship between the inner peripheral surface 41a of the sleeve 41 and the flange surface 42b of the hub 42. As described above, the sleeve 41 and the hub 42 are gripped in a constant holding condition by the chuck mechanism 61 and are subjected to cutting while being rotated around the central axis L.

Accordingly, such highly accurate finishes are achieved that the inner peripheral surface 41a of the sleeve 41 is substantially parallel to the central axis L, and that the flange surface 42b of the hub 42 is substantially normal to the central axis L. Hence, the flange surface 42b of the hub 42 is finished to be normal to the inner peripheral surface 41a of the sleeve 41 with a high degree of accuracy. In the spindle motor 1 thus manufactured, the inner peripheral surface 41a of the sleeve 41 receives stable radial dynamic pressure of the lubricant oil 51 that is filled between the inner peripheral surface 41a and the outer peripheral surface of the shaft 34. And besides, the disks 22 are supported stably on and over the flange surface 42b of the hub 42 in an attitude that is substantially normal to the central axis L, with the result of increased rotational accuracy of the disks 22 and the heads' 231 floating stably over the recording surfaces of the disks 22 at a uniform distance.

A similar advantage can be obtained for the relationship between the inner peripheral surface 41a of the sleeve 41 and the respective upper and lower surfaces 41b and 41c of the sleeve 41. That is, such highly accurate finishes can be achieved that the inner peripheral surface 41a of the sleeve 41 is substantially parallel to the central axis L, and that the upper and lower surfaces 41b and 41c of the sleeve 41 are substantially normal to the central axis L. Accordingly, the upper and lower surfaces 41b and 41c of the sleeve 41 are finished to be normal to the inner peripheral surface 41a of the sleeve 41 with a high degree of accuracy.

In the spindle motor 1 thus manufactured, good functionality can be attained of the respective thrust bearing parts provided between the upper surface 41b of the sleeve 41 and the upper thrust washer 341 and between the lower surface 41c of the sleeve 41 and the lower thrust washer 342, so that the sleeve 41 can be supported stably between the upper and lower thrust washers 341 and 342.

The following advantages can be obtained with respect to the relationship between the inner peripheral surface 41a of the sleeve 41 and the pump seal surface 421a of the hub 42. That is, such highly accurate finishes can be achieved that the inner peripheral surface 41a of the sleeve 41 and the pump seal surface 421a of the hub 42 are substantially parallel to the central axis L. Accordingly, the inner peripheral surface 41a of the sleeve 41 and the pump seal surface 421a of the hub 42 are provided in improved coaxiality. Also, the inner peripheral surface 41a of the sleeve 41 and the pump seal surface 421a of the hub 42 are located even more accurately relative to each other.

In the spindle motor 1 thus manufactured, a stable uniform distance is provided between the outer peripheral surface 341b of the upper thrust washer 341 and the pump seal surface 421a of the hub 42, so that the lubricant oil 51 is prevented from leaking from between the outer peripheral surface 341b of the upper thrust washer 341 and the pump seal surface 421a of the hub 42.

Further, the following advantages can be obtained with respect to the relationship between the inner peripheral surface 41a of the sleeve 41 and the processing reference plane 42c of the hub 42. That is, such highly accurate finishes can be achieved that the inner peripheral surface 41a of the sleeve 41 is substantially parallel to the central axis L, and that the processing reference plane 42c of the hub 42 is substantially normal to the central axis L.

Thus, the processing reference plane 42c of the hub 42 is finished to be normal to the inner peripheral surface 41a of the sleeve 41 with a high degree of accuracy. Hence, in subsequent step S4, the radial dynamic pressure groove arrays 411a and 411b and the upper and lower thrust dynamic pressure groove arrays 412 and 413 can be formed at accurate positions on the inner peripheral surface 41a, the upper surface 41b, and the lower surface 41c of the sleeve 41, respectively, with reference to the processing reference plane 42c.

The cutting tool 62 performs cutting on the border B between the sleeve 41 and the hub 42 by being moved continuously from the surface of the hub 42 to the surface of the sleeve 41. Thus, the border B is cut evenly to provide a smooth transition from the hub 42 to the sleeve 41 at the border B.

Moreover, in the present embodiment, the sleeve 41 and the hub 42 are fixed to each other through shrink fitting, and then cutting is performed on the surfaces of the sleeve 41 and the hub 42. Although a slight distortion is inevitably produced both in the sleeve 41 and the hub 42 in fixing the sleeve 41 and the hub 42, the cutting is performed thereafter in the present embodiment, and therefore the surfaces of the sleeve 41 and the hub 42 can be finished with a high degree of accuracy with respect to the central axis L, irrespective of the distortion produced in the fixing.

After the cutting on the sleeve 41 and the hub 42 is completed, the sleeve 41 and the hub 42 are subjected to cleaning in order to remove abatement from the surfaces of the sleeve 41 and the hub 42 (step S3).

After that, the radial dynamic pressure groove arrays 411a and 411b, the upper and lower thrust dynamic pressure groove arrays 412 and 413, and the pump groove array 421b are formed on the inner peripheral surface 41a, the upper surface 41b, and the lower surface 41c of the sleeve 41, and the pump seal surface 421a of the hub 42, respectively (step S4).

The radial dynamic pressure groove arrays 411a and 411b and the upper and lower thrust dynamic pressure groove arrays 412 and 413 can be formed by means of so-called electrolyzing, in such a way that, for example, an electrode is disposed opposite the surfaces to be provided with the dynamic pressure groove arrays with an electrolyte filled therebetween, and a current is applied from the electrode to partly elute a metal component of the sleeve 41.

A jig for electrolyzing (a jig with the electrode) has a contact surface to be contacted with the processing reference plane 42c of the hub 42. During electrolyzing, the electrode is regulated positionally through the contact between the contact surface of the jig and the processing reference plane 42c of the hub 42 so as to set positions to be provided with the radial dynamic pressure groove arrays 411a and 411b and the upper and lower thrust dynamic pressure groove arrays 412 and 413, on the surfaces of the sleeve 41. Another processing method such as ball rolling may be used to form the radial dynamic pressure groove arrays 411a and 411b and the upper and lower thrust dynamic pressure groove arrays 412 and 413.

The pump groove array 421b can be formed through, e.g., so-called ball rolling, where a jig with a ball-like projection is inserted while being rolled at the inner peripheral side of the pump seal surface 421a of the hub 42. In the ball rolling also, the position to be provided with the pump groove array 421b can be set accurately on the pump seal surface 421a by locating the jig with reference to the processing reference plane 42c of the hub 42. It should be noted that another processing method such as electrolyzing may be used to form the pump groove array 421b; however, in the case where the hub 42 is mainly made from aluminum as in the present embodiment, it is difficult to carry out electrolyzing on aluminum, and thus the pump groove array 421b is desirably formed through ball rolling.

When the radial dynamic pressure groove arrays 411a and 411b, the upper and lower thrust dynamic pressure groove arrays 412 and 413, and the pump groove array 421b are formed completely, then the shaft 34 and the upper and lower thrust washers 341 and 342 are fitted to the unit comprised of the sleeve 41 and the hub 42 (step S5).

Specifically, the lower thrust washer 342 is first fitted over the shaft 34, and the shaft 34 and the lower thrust washer 342 are bonded to each other with an adhesive. Then, the shaft 34 is inserted into the sleeve 41 from below. Further, the upper thrust washer 341 is fitted over an upper portion of the shaft 34 that projects beyond the upper surface of the sleeve 41, and the shaft 34 and the upper thrust washer 341 are bonded to each other with an adhesive.

Through this procedure, the unit comprised of the shaft 34 and the upper and lower thrust washers 341 and 342, and the unit comprised of the sleeve 41 and the hub 42 are engaged with each other so as to be rotatable relative to each other. After that, the cap 427 is attached to the upper surface of the first cylindrical portion 421 of the hub 42, and the hub 42 and the cap 427 are bonded to each other with an adhesive.

Subsequently, the lubricant oil 51 is filled in the gap provided around the sleeve 41 between the upper and lower thrust washers 341 and 342 (step SE). Specifically, the unit including the sleeve 41, the hub 42, and the shaft 34 is first housed in a predetermined chamber, and the inside of the chamber is decompressed.

Then, the lubricant oil 51 is injected through the clearance between the lower thrust washer 342 and the hub 42, and the pressure inside the chamber is thereafter recovered, whereupon the lubricant oil 51 is supplied in the gap around the sleeve 41. The lubricant oil 51 is filled uninterruptedly between the sleeve 41 and the shaft 34, between the sleeve 41 and the upper thrust washer 341, between the sleeve 41 and the lower thrust washer 342, and in the oil groove 41d provided along the outer peripheral surface of the sleeve 41.

After that, the yoke 431 and the rotor magnet 43 are attached to the lower surface of the flat portion 422 of the hub 42 (step S7). Specifically, an upper portion of the yoke 431 is press fitted so that it is interlocked with a projecting portion provided on the lower surface of the flat portion 422 of the hub 42, thereby fastening the yoke 431 to the hub 42. The yoke 431 and the rotor magnet 43 are fixed to each other, e.g., with an adhesive.

After the above-described series of processes, or along with the above-described series of processes, the stator core 32 and the coils 33 are fixed to the base member 31 (step S8). Specifically, for example, the core back 321 of the stator core 32 is press fitted over the outer peripheral surface of the holder part 312 of the base member 31, thereby fastening the stator core 32 to the base member 31. The conductive wires extending from the coils 33 are connected to the connector 331.

After that, the lower end portion of the shaft 34 is press fitted within the through hole 311 of the base member 31, thereby fastening the shaft 34 to the base member 31 (step S9). With this process, the spindle motor 1 is completed.

Although a preferred embodiment of the present invention has been described above, the present invention is not limited thereto, and various modifications can be made.

For instance, while in the foregoing embodiment, a single cutting tool 62 is used to perform cutting on the surfaces of the hub 42 and the sleeve 41, more than one cutting tools may be used to perform cutting. That is, cutting may be performed using a plurality of cutting tools according to the position to be cut, with the hub 42 being chucked in a constant holding condition and rotated by the chuck mechanism 61.

Figure 12:
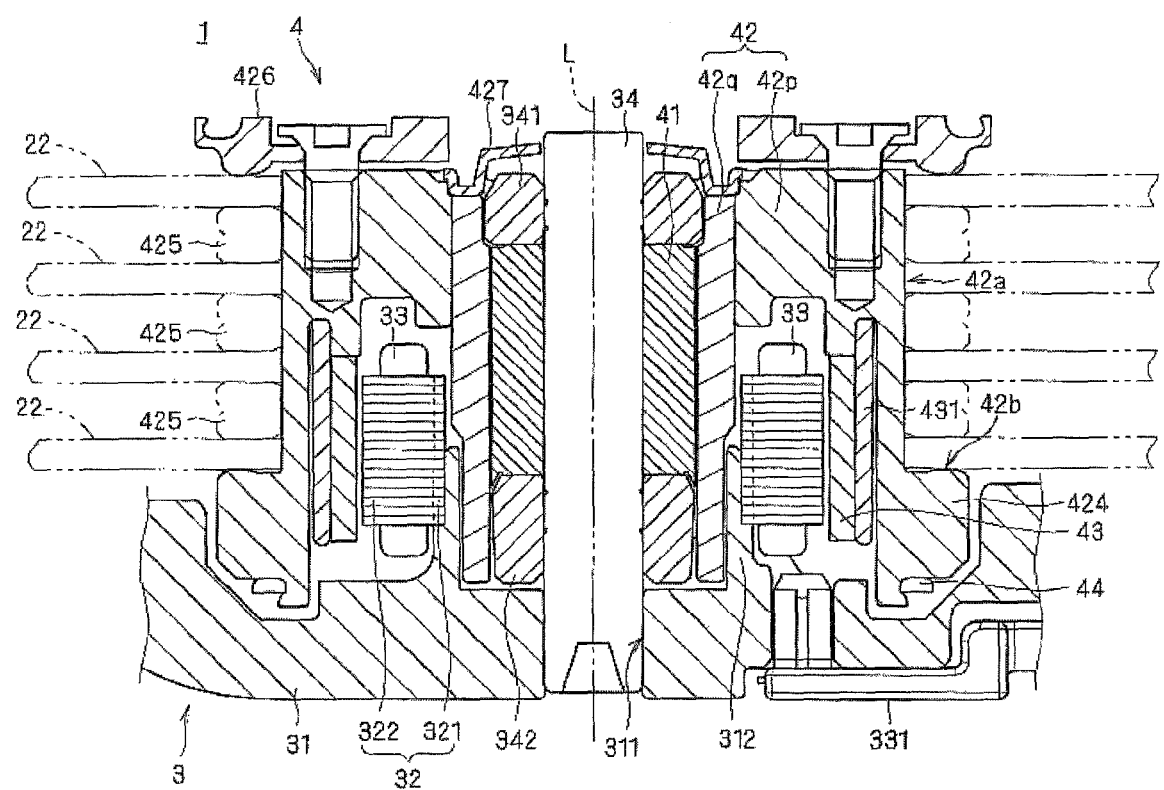
FIG. 12 is a cross-sectional view of a spindle motor according to a modification of the present invention, taken along a plane including the central axis.

Also, in the foregoing embodiment, the hub 42 is provided as a single member; however, as shown in FIG. 12, the hub 42 may be constituted by a plurality of members, i.e., a hub main body 42p and a bearing housing part 42q. In the example shown in FIG. 12, the bearing housing part 42q and the sleeve 41 are fixed to each other through shrink fitting, thereby constructing the sleeve 41, the bearing housing part 42q, and the hub main body 42p integrally. The bearing housing part 42q can be easily shrink fitted to the sleeve 41 if the bearing housing part 42q is formed mainly from copper or a resin that has a large coefficient of linear expansion. It should be noted however that, as in the foregoing embodiment, the hub 42 provided as a single member helps reducing unevenness on the surfaces of the hub 42 and can eliminate residual cutting oil.

Further, although in the foregoing embodiment, the pump groove array 421b is provided on the pump seal surface 421a of the hub 42, the pump groove array 421b may be provided either on the pump seal surface 421a of the hub 42 or on the outer peripheral surface of the upper thrust washer 341. Moreover, although in the foregoing embodiment, the radial dynamic pressure groove arrays 411a and 411b are provided on the inner peripheral surface 41a of the sleeve 41, the radial dynamic pressure groove arrays 411a and 411b may be provided either on the inner peripheral surface 41a of the sleeve 41 or on the outer peripheral surface of the shaft 34.

Similarly, although in the foregoing embodiment, the upper thrust dynamic pressure groove array 412 is provided on the upper surface 41b of the sleeve 41, the upper thrust dynamic pressure groove array 412 may be provided either on the upper surface of the sleeve 41 or on the lower surface of the upper thrust washer 341. Also, while in the foregoing embodiment, the lower thrust dynamic pressure groove array 413 is provided on the lower surface 41c of the sleeve 41, the lower thrust dynamic pressure groove array 413 may be provided either on the lower surface 41c of the sleeve 41 or on the upper surface of the lower thrust washer 342.

In addition, while in the foregoing embodiment, the hub 42 is made mainly from aluminum, the hub 42 may be formed from a metal material such as stainless steel or a cold reduced carbon steel sheet (SPCC, SPCD, SPCE, according to the JIS standard). If, however, a material having a large coefficient of linear expansion, such as aluminum, is used, shrink fitting can be carried out easily.

Figure 13:
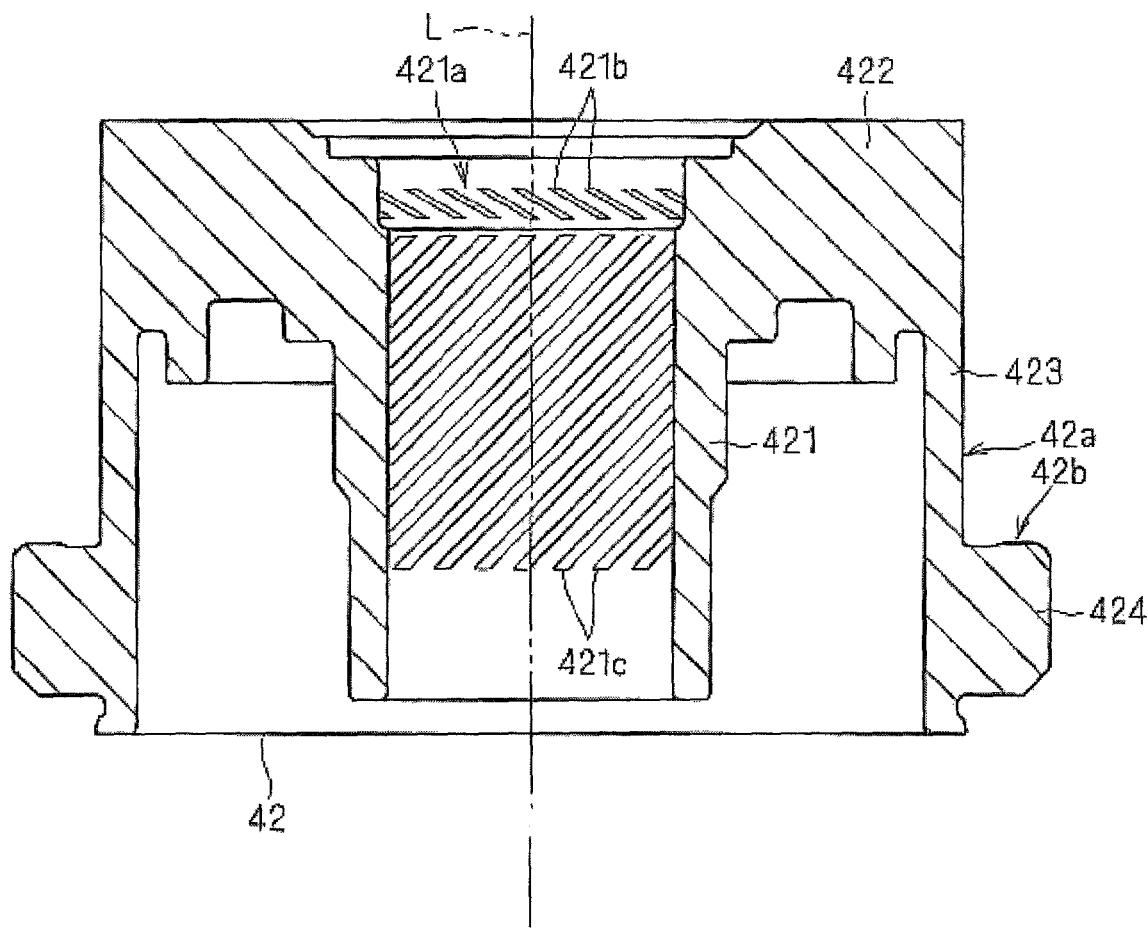
FIG. 13 is a cross-sectional view of a hub according to a modification of the present invention, taken along a plane including the central axis.

Furthermore, in the foregoing embodiment, the radial dynamic pressure groove array 411b is formed into a vertically asymmetric herringbone shape, so as to align the flow of the lubricant oil 51 into unidirectional circulation. As shown in FIG. 13, however, an array 421c of spiral grooves may be provided on the inner peripheral surface of the hub 42, so as to cause the lubricant oil 51 to circulate in a single direction through such a groove array 421c.

In the example shown in FIG. 13, the lubricant oil 51 flows into either upper ends or lower ends of the grooves of the array 421c depending on the rotation direction of the hub 42, and the lubricant oil 51 goes out from the other end of the grooves; therefore, a vertical flow of the lubricant oil 51 is formed between the sleeve 41 and the hub 42 along the spiral groove array 421c, and thus the lubricant oil 51 can be circulated in a single direction. The use of such a spiral groove array 421c can eliminate the need to form the radial dynamic pressure groove array 411b in a vertically asymmetric shape, which permits the position to form the radial dynamic pressure groove array 411b to be decided with increased flexibility.

Also, in the foregoing embodiment, the chuck mechanism 61 holds the unit comprised of the hub 42 and the sleeve 41 by engaging holding pawls onto the inner peripheral surface of the second cylindrical portion 423 of the hub 42. The chuck mechanism 61 may however grip another portion of the hub 42, or may grip the sleeve 41.

And besides, the above spindle motor 1 is for rotating the magnetic disks 22, but the present invention may be applied to spindle motors for rotating other kinds of recording disks such as optical disks.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method of manufacturing a spindle motor including a shaft disposed along a central axis, an annular portion stretching radially outward from an outer peripheral surface of the shaft, a substantially cylindrical sleeve receiving the shaft and having an inner peripheral surface radially opposite the outer peripheral surface of the shaft and a bearing surface opposite the annular portion, and a hub rotating together with the sleeve and supporting a disk, the method comprising the steps of:

a) fixing the sleeve and the hub to each other; and
 b) after the step a), performing cutting on the inner peripheral surface of the sleeve, the bearing surface of the sleeve, and a flange surface of the hub for mounting the disk thereon with the sleeve and the hub being gripped and rotated around the central axis; wherein in the step b), the cutting is continuously performed by making a single pass with a single cutting tool on a surface of the sleeve and a surface of the hub at a border between the sleeve and the hub.

2. The manufacturing method according to claim 1, wherein in the step b), while the cutting is being performed, the sleeve and the hub are gripped in a constant holding condition and rotated around the central axis.

3. The manufacturing method according to claim 1, wherein the bearing surface is a thrust bearing surface axially opposite a lower surface of the annular portion across a minute gap.

4. The manufacturing method according to claim 1, wherein the hub includes a cylindrical surface radially opposite an outer peripheral surface of the annular portion across a gap, and in the step b), cutting is performed on the inner peripheral surface of the sleeve, the bearing surface of the sleeve, the flange surface of the hub, and the cylindrical surface with the sleeve and the hub being gripped and rotated around the central axis.

5. The manufacturing method according to claim 1, further comprising the step of c) after the step b), forming, on the inner peripheral surface of the sleeve, an array of grooves for producing dynamic pressure to induce hydrodynamic pressure.

6. The manufacturing method according to claim 5, wherein the hub includes a processing reference plane to be referred to in setting a processing position for forming the array of grooves for producing dynamic pressure, and in the step b), cutting is performed on the inner peripheral surface of the sleeve, the bearing surface of the sleeve, the flange surface of the hub, and the processing reference plane with the sleeve and the hub being gripped and rotated around the central axis.

7. The manufacturing method according to claim 1, further comprising the step of d) after the step b), forming, on the bearing surface of the sleeve, an array of grooves for producing dynamic pressure to induce hydrodynamic pressure.

8. The manufacturing method according to claim 7, wherein the hub includes a processing reference plane to be referred to in setting a processing position for forming the array of grooves for producing dynamic pressure, and in the step b), cutting is performed on the inner peripheral surface of the sleeve, the bearing surface of the sleeve, the flange surface of the hub, and the processing reference plane with the sleeve and the hub being gripped and rotated around the central axis.

9. The manufacturing method according to claim 1, wherein in the step b), the cutting is continuously performed over surfaces of the sleeve and surfaces of the hub from the inner peripheral surface of the sleeve to the flange surface of the hub with the sleeve and the hub being gripped and rotated around the central axis.

10. The manufacturing method according to claim 1, wherein in the step b), the cutting is continuously performed over surfaces of the sleeve and surfaces of the hub from the inner peripheral surface of the sleeve through the bearing surface to the flange surface of the hub with the sleeve and the—hub being gripped and rotated around the central axis.

11. The manufacturing method according to claim 1, wherein in the step a), the sleeve and the hub are fixed to each other through shrink fitting.

12. The manufacturing method according to claim 11, wherein the hub is made from aluminum.

13. A spindle motor manufactured through the manufacturing method of claim 1.

* * * * *